Patented Dec. 28, 1948

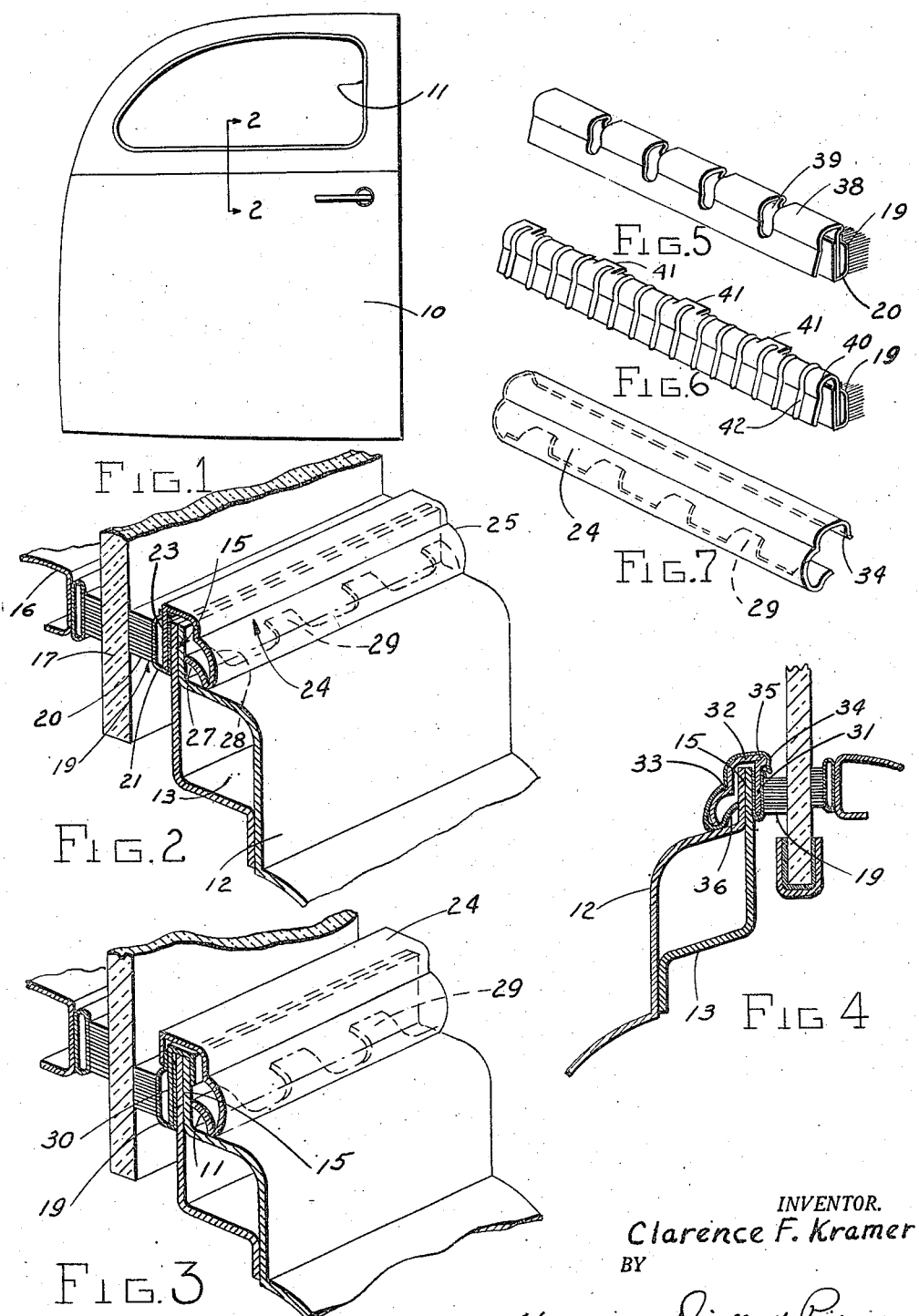

2,457,312

UNITED STATES PATENT OFFICE 2,457,312

WEATHERSTRIP MOLDING

Clarence F. Kramer, Birmingham, Mich.

Application July 30, 1945, Serial No. 607,767

7 Claims. (Cl. 296—44.5)

The invention relates to motor vehicles generally, and it has particular relation to a weatherstrip and molding for use along the edge of window openings. In certain respects the invention is related to and constitutes an improvement over that embodied in my copending application for patent, Serial No. 587,046, filed April 7, 1945.

One object of the present invention is to provide a combined weatherstrip holding element and a decorative molding so that a single decorative strip may be used for both purposes.

Another object of the invention is to provide a construction of this character wherein the strip is held on a welding flange or the like by concealed holding means of such character that the strip will automatically hold itself in position once it is moved into place.

Another object of the invention is to provide an improved combination of weatherstrip holding member and decorative molding involving two pieces wherein the decorative molding serves both to cover the holding strip and to fasten the combination in place on a welding flange or the like.

Other objects of the invention will become apparent from the following specification, from the drawings relating thereto, and from the claims hereinafter set forth.

For a better understanding of the invention, reference may be had to the drawings wherein:

Fig. 1 is a side view of an automobile door having a decorative molding and weatherstrip arrangement constructed according to one form of the invention;

Fig. 2 is a cross-sectional view on a larger scale taken substantially along the line 2—2 of Fig. 1;

Fig. 3 is a view similar of Fig. 2 illustrating another form of the invention;

Fig. 4 is a similar view of still another form of the invention;

Fig. 5 illustrates a weatherseal holding strip constructed according to one form of the invention, as seen removed from the door;

Fig. 6 is a view of another form of weatherseal holding strip constructed according to another form of the invention; and, Fig. 7 is a view of the decorative molding in Fig. 4 as seen when removed.

Referring to Figs. 1 and 2, the door of the vehicle is indicated at 10 and a window opening therein is indicated at 11. As shown in particular by Fig. 2, the door is provided with an outer panel 12 and a re-enforcing panel 13, and these are welded to each other to form a welding flange indicated at 15. The inner panel of the door is indicated at 16 and between the two panels a space is provided for the window indicated at 17.

According to the present invention, a weatherseal or weather pad 19 is provided at the inner side of the welding flange 15, and this seal is of a soft pile or felt material 20 which contacts the window glass 17. Such material is secured to a light weight cloth or similar strip, and the weather pad thus provided is secured to a depending leg or flange 23 of a metal molding or decorative strip 24. The molding 24 may be considered generally as of C or U shape with the inner leg 23 projecting along the inner side of the flange 15, while its outer leg indicated at 25 projects along the outer side of the flange.

In order to hold the molding in place and consequently the weather pad in position, the outer leg 25 of the molding has its free edge portion reversely turned towards the welding flange as indicated at 27, and this reversely turned portion has notches 28 so as to provide separated tongues or prongs 29. The distance between the edges of the prongs and the leg 23 is such that when the molding is pressed downwardly over the welding flange, the prongs and leg 23 must resiliently be spread apart further than normal and as a result the prongs resiliently bite into or engage the outer side of the flange. Consequently, once the molding is pressed downwardly over the welding flange, it strongly resists reverse movement and the molding will be held firmly in position.

In the construction shown by Fig. 3, the weather pad, indicated at 19, is fastened to a separate metal strip 30 which is generally of U shape and this strip straddles the welding flange 15. With the strip 30 in place, the decorative molding 24 is applied over the strip and the prongs 29 act to hold the assembly on the welding flange. It will be noted that the outer leg of the strip 30 is shorter than the inner leg so as to allow the prongs 29 to directly engage or contact the welding flange. Also it will be noted that the inner leg of the decorative molding 24 is shorter than the leg 23 seen in Fig. 2, so as to avoid interference with the pile portion of the weather pad. It should be understood that the strip 30 carrying the pad 19 may be placed over the welding flange and that thereafter the molding 24 may be applied, although it would be possible to assemble the parts first and then place the assembly over the welding flange as a unit.

In the construction shown by Figs. 4 and 7, the weatherseal indicated at 19 is fastened to the inner leg 31 of a generally U-shaped retaining strip 32 which straddles the welding flange 15. The decorative molding is indicated at 33 and it includes an inner leg 34 which is adapted to snap over a bead 35 formed along the base of the inner leg 31 of the seal holding strip, while the outer leg of the molding covers the outer leg of the strip 32. The outer leg of the molding is reversely turned as indicated at 36, and the reversely turned portion extends under the outer leg of the holding strip and has prongs 29 as shown in Fig. 7, which engage the outer wall of the welding flange. The two parts are assembled before applying them to the welding flange, and it should be evident that once they are assembled, it is only necessary to press the assembly over the welding flange.

Fig. 5 shows a weatherseal retaining strip 38 generally of U shape with the base portion of the strip and portions of the legs slotted as indicated at 39 so as to facilitate bending the strip in the plane of its legs. This strip may be used in an assembly such as shown by Fig. 4.

The structure shown by Fig. 6 may also be used in place of the holding strip 32 shown in Fig. 4, and comprises a U-shaped strip indicated at 40 having spaced corrugations 42 adapted to facilitate bending the strip in the plane of the glass or in other words, in the plane of the legs of the strip. The base portion of this strip is provided with spaced struck out tongues indicated at 41, and these tongues are adapted to co-operate with the leg 34 of the molding seen in Fig. 4 in order to hold the molding in place. In other words, the leg 34 of the molding is adapted to snap over the tongues 41.

Although more than one form of the invention has been illustrated and described in detail, it will be apparent to those skilled in the art that various modifications may be made without departing from the scope of the claims.

What is claimed is:

1. In combination with a welding flange or the like along the margin of a window opening, a sealing material on the inner side of the flange, a U shape retainer straddling the flange and holding the sealing material in place, a channel shape molding having one edge portion turned and engaged under the outer edge of the outer leg of the retainer and having its other edge portion sprung over the base of the retainer, and prongs on the inner edge of the turned portion engaging the flange for holding the molding on the flange.

2. In combination with a welding flange or the like along the margin of a window opening, a sealing material on the inner side of the flange, a U shape retainer straddling the flange and holding the sealing material in place, a channel shape molding having one edge portion turned and engaged under the outer edge of the outer leg of the retainer and having its other edge portion sprung over the base of the retainer, and prongs on the inner edge of the turned portion engaging the flange for holding the molding on the flange, said prongs having a resilient engagement with the flange so as to permit assembly by pressing the retainer over the flange.

3. An article of manufacture comprising a generally U shape sealing strip retainer adapted to straddle a welding flange or the like along a window opening, and a C shape molding embracing the base and one leg of the strip and having one edge portion projecting over and to the inner side of said leg and terminating in projections adapted to engage the welding flange to hold the assembly on the latter.

4. An article of manufacture comprising a generally U shape sealing strip retainer adapted to straddle a welding flange or the like along a window opening, and a C shape molding embracing the retainer with one edge hooked over and engaging the outer side of one leg of the latter, the outer edge portion of the molding projecting beyond and then inwardly over the free edge of the other leg of the retainer and having its edge notched out to form projections between the notches which are adapted to engage the welding flange to hold the assembly on the latter.

5. In combination with a welding flange or the like along the margin of a window opening, a sealing strip disposed along the inner side of the flange for engagement with a window glass, a channel shape molding strip straddling the flange and having the free edge portion on its outer leg reversely turned towards the flange and provided with linearly spaced notches so as to form prongs between the notches, said prongs engaging the flange to hold the molding thereon, the other leg of the molding strip extending along the inner side of the flange and engaging the sealing strip so as to hold it in place for engagement with the window.

6. In combination with a welding flange or the like along the margin of a window opening, a sealing strip along the inner side of the flange, a retainer strip extending along the flange and engaging the sealing strip so as to hold it in place, and a channel shape molding straddling the flange and having its inner edge portion extending over and holding the retainer strip in place and its outer edge portion reversely turned towards the flange and provided at its free edge with linearly spaced notches so as to form prongs between the notches, the prongs engaging the flange to hold the molding thereon.

7. An article of manufacture comprising a sealing strip retainer having a wall adapted to extend along the inner side of a welding flange or the like of a window opening and having a base portion adapted to extend laterally outwardly over the edge of the flange, and a channel shape molding having one edge portion embracing the base portion of the retainer and having its other edge portion notched out at linearly spaced points to provide prongs which are adapted to engage the welding flange to hold the assembly thereon.

CLARENCE F. KRAMER.

REFERENCES CITED

The following references are of record in the file of this patent:

UNITED STATES PATENTS

| Number | Name | Date |
|---|---|---|
| 1,688,371 | Bailey | Oct. 23, 1928 |
| 2,196,888 | Bailey | Apr. 9, 1940 |
| 2,214,918 | Ball | Sept. 17, 1940 |